United States Patent [19]

Buan et al.

[11] Patent Number: 5,643,501
[45] Date of Patent: Jul. 1, 1997

[54] ADDITIVES FOR POLYMER COMPOSITIONS

[75] Inventors: Angeles Lillian Buan, Crystal Lake; Dean Laurin, Round Lake Beach, both of Ill.

[73] Assignee: Baxter International Inc., Deerfield, Ill.

[21] Appl. No.: 194,742

[22] Filed: Feb. 9, 1994

Related U.S. Application Data

[63] Continuation-in-part of Ser. No. 889,550, May 27, 1992, abandoned.

[51] Int. Cl.$^6$ .......................... C09K 15/06; C09K 15/10; C08K 5/05
[52] U.S. Cl. ................. 252/407; 252/400.1; 252/400.52; 252/406; 524/114; 524/178; 524/399; 524/567
[58] Field of Search ........................ 252/400.1, 400.52, 252/406, 407; 524/114, 178, 399, 567

[56] References Cited

U.S. PATENT DOCUMENTS

| | | | |
|---|---|---|---|
| 3,558,539 | 1/1971 | Irish, Jr. | 260/23 |
| 4,039,486 | 8/1977 | van der Mark | 260/2.5 P |
| 4,474,913 | 10/1984 | Lindner | 524/100 |
| 4,571,118 | 2/1986 | Schmanski | 404/10 |
| 4,657,542 | 4/1987 | Ohachi | 604/410 |
| 4,751,118 | 6/1988 | Wypart et al. | 428/35 |
| 4,808,476 | 2/1989 | Mikus et al. | 428/413 |
| 5,064,908 | 11/1991 | Schuster et al. | 525/333 |
| 5,070,128 | 12/1991 | Gay | 524/357 |
| 5,118,741 | 6/1992 | Amano et al. | 524/178 |
| 5,177,135 | 1/1993 | Wehner et al. | 524/315 |
| 5,283,273 | 2/1994 | Sander et al. | 524/399 |
| 5,302,644 | 4/1994 | Worschech et al. | 252/407 |

FOREIGN PATENT DOCUMENTS

| | | |
|---|---|---|
| 83-714226 | 6/1983 | European Pat. Off. . |
| 2192004A | 12/1987 | European Pat. Off. . |
| 0295534A3 | 6/1988 | European Pat. Off. . |
| 0295534A2 | 12/1988 | European Pat. Off. . |
| 92-086187 | 2/1992 | European Pat. Off. . |
| 160455A | 8/1983 | Germany . |
| 120646 | 9/1980 | Japan . |
| 58-098351 | 6/1983 | Japan . |
| 1145243 | 12/1984 | Japan . |
| 4031460 | 2/1992 | Japan . |
| WO93/24563 | 12/1993 | WIPO . |

OTHER PUBLICATIONS

M. W. MacKenzie et al., "An Infra-Red Spectroscopic Study of the Stabilization of Poly(Vinyl Chloride) by Zinc and Calcium Stearates," Eur. Polym., J. Vol. 19 No. 6, pp. 511–517, 1983.

E.W.J. Michell, "True Stabilization: A Mechanism for the Behavior of Lead Compounds and Other Primary Stabilizers Against PVC Thermal Dehydrochlorination," Journal of Vinyl Technology, Jun. 1986, vol. 8, No. 2.

Bela Ivan et al., "Effect of Metal Stearate Stabilizers of the Thermal Degradation of PVC in Solution: The Reversible Blocking Mechanism of Stabilization," Journal of Vinyl Technology, Sep. 1990, vol. 12, No. 3.

Rudolph D. Deanin et al., "Synergistic Interaction in Zinc/Epoxy/Phosphite Stabilization of Polyvinyl Chloride," Polymer Engineering and Science, Mar., 1973, vol. 13, No. 1.

Tran Van Hoang, "Stabilization of PVC by Epoxy Compounds in the Presence of Lewis Acid Metal Chlorides," CNRS–Laboratoire des Materiaux Organiques–BP24, pp. 323–326.

Excerpt labeled, "Antioxidants/Polyvinyl Chloride Resins," pp. 132–149.

Leonard I. Nass, "Theory of Degradation and Stabilization Mechanisms," Chapter 8, pp. 271–293.

Leonard I. Nass, "Actions and Characteristics of Stabilizers," Encyclopedia of PVC, vol. 1, Chapter 9, pp. 295–378.

Ernest W. Flick, "Plastics Additives: An Industrial Guide," pp. 540–609, Noyes Publications, 1986.

*Primary Examiner*—Tae Yoon
*Attorney, Agent, or Firm*—Thomas S. Borecki; Charles R. Mattenson; Joseph A. Fuchs

[57] ABSTRACT

An additive system for a polyvinyl chloride formulation for improved processability while maintaining thermal stability of the formulation, and having a low-water-blush haze and low extractability in an aqueous media, the additive system including a primary stabilizer which is a Lewis acid metal compound selected from the group consisting of organo-tin compounds and organo-zinc compounds, a secondary stabilizer selected from the group consisting of epoxide compounds having less than approximately 5.2 oxirane groups per molecule; and, an external lubricant for lubrication of the PVC formulation, wherein a critical ratio of the primary stabilizer to the secondary stabilizer maximizes thermolytic color stability while limiting generation of excessive build-up, plate-out, dark particles during the processing of the polyvinyl chloride formulation. And wherein the invention provides concentration levels of the stabilizers and an oxirane per molecule content of the secondary stabilizer which minimizes the extractbiles in aqueous media.

9 Claims, No Drawings

ADDITIVES FOR POLYMER COMPOSITIONS

RELATED APPLICATION

This application is a continuation-in-part application of U.S. application Ser. No. 07/889,550, abandoned, filed May 27, 1992, entitled "Additives for Vinyl Chloride Polymer Compositions."

BACKGROUND OF THE INVENTION

The present invention relates to vinyl chloride polymer formulations for medical use. More specifically, the present invention relates to the stabilization of a flexible, plastic vinyl chloride polymer formulation for sterilizable medical devices made from the formulations.

Various polymer formulae can be utilized to create extruded and molded products such as flexible containers, tubing devices and injection molded articles. As examples, flexible containers and tubing devices are utilized in the medical industry for containing and delivering inter alia, parenteral solutions such as intravenous solutions, dialysis solutions, drugs and medications, nutrition products, respiratory therapy products, blood, plasma and other blood related products. When utilized in the medical industry, these products will often contain or contact fluids or solids that are introduced into a patient's body. It is, therefore, necessary for these devices to be essentially transparent; flexible; essentially free of extractables; nonabsorbent of the fluids or solids to be contained; essentially free of particulate matter; and capable of maintaining a product contained therein under sterile conditions until the product is accessed or removed. The plastic material from which these containers, tubing and other articles are constructed must also meet these requirements.

It is also important that the plastic material used in constructing these containers, tubing and other articles is sufficiently strong so that the products constructed from the plastic material have sufficient strength. Furthermore, it is desirable, for economic reasons, that any such plastic material be readily constructed into a container, tubing or other article on commercially available, or easily modified, production machinery. Factors such as production rates, material stabilization, particulate generation, scrap rates and potential regrind are critical considerations in determining the processability of any plastic material used in constructing these types of products.

As set forth above, because the plastic material will be processed into flexible containers and other medical devices that either house or come into contact with a medical product that is introduced into a patient's body, it is necessary that the plastic does not contain chemicals that can be extracted by the medical product or are likely to pass with the medical product into the patient's body. This is especially critical with respect to the various additives to the polymer formulation which are utilized to make the plastic material flexible, generally processable and stable. The toxicity of such additives has been a matter of concern and an area of monitoring.

It has been customary for medical devices such as intravenous solution bags, dialysis containers, blood bags, administration sets and tubing, to be sterilized thermally or by the action of a chemical sterilizing agent such as ethylene oxide gas. In the case of thermal sterilization, however, there has been the problem that the synthetic resin used in such medical containers, tubing and other articles is required to resist thermal degradation. In the case of sterilization with ethylene oxide gas, there has been the problem that, after sterilization, a good deal of time is wasted before the sterilized medical containers, tubing and other articles are free from ethylene oxide gas. As an alternative, sterilization by radiation has been proposed. Since this method is carried out at low temperatures, there is no longer a requirement that the materials of medical containers, tubing and other articles should be capable of withstanding heat and resisting thermal degradation. Nevertheless, radiation may cause such adverse effects as deterioration such as discoloration, haziness when subsequently exposed to water, and increased extractibles of the irradiated medical containers, tubing and other articles unless the plastic materials are properly formulated.

Vinyl chloride polymers ("PVC") have many excellent qualities which make it one of the world's leading commercial plastics. In the medical industry, PVC is widely used in numerous applications including intravenous and drug delivery containers, dialysis containers, blood bags, solution administration sets, tubing and other molded articles. Various plasticizers, stabilizers and other additives have been relied upon in the processing and utilization of PVC for these medical uses but at the acceptance of some other potentially adverse properties. For example, flexible containers and tubing are generally required to have low extractables, low absorption, low water-blush haze, low color, good transparency and should not contaminate fluids carried by the container or tubing with particles. During manufacturing, plasticizers, stabilizers and other additives are utilized during manufacturing for improved processing of PVC, in terms of shorter production times, decreased wear and tear of equipment, absence of particulate matter, low scrap rates and high regrind rates. And ultimately, the PVC container must be stable both during manufacture, processing and use.

PVC's acknowledged weakness is thermal instability during processing and use, resulting in dehydrochlorination and conjugated unsaturation, and leading to increasing discoloration as the length of the conjugation increases. Thermal degradation has been retarded by the addition of a combination of certain selected stabilizers, typically including calcium soap, zinc soap, organo-tin compounds including dialkyl tin esters such as alkyl carboxylic esters (such as laurate and stearate), di(n-octyl)tin maleate polymer and di(n-octyl)tin-S,S'-bis(isooctyl)mercaptoacetate, epoxidized fatty esters and organic phosphite esters.

To meet low amounts of extractable materials required of such medical containers, tubing and other articles, stabilization and processing difficulties may be encountered by degradation of PVC due to low stabilizer content. This low stabilizer content however, has the opposite positive effect by reducing the aqueous extractables from the PVC film. When higher extractables are tolerable or stability of the PVC is more critical, higher amounts of processing aids and stabilizers may be used, but then processing difficulties can be encountered from the plate-out of the excess lubricant or build-up of cross-linked ("cured") epoxides and of other processing aids on the die and chill roll equipment during known extrusion and molding techniques.

Prior attempts at providing a stabilizer system for PVC have been largely unsuccessful due to the incorporation of components that lead to high extractables, poor processability as measured by the plate-out and build-up on equipment, high water-blush haze and high color. For example, U.S. Pat. No. 3,558,539 discloses a stabilizer system for PVC which includes five components including calcium and magnesium salts of a long-chain monocarboxylic fatty acid, a tri-substituted organo monophosphite, and an tri-substituted organo polyphosphite. The addition of these components to a PVC stabilizer system leads to a high water-blush haze upon autoclaving the stabilized PVC film at 121° C., and a high amount of low molecular weight water soluble compounds that lead to a high concentration of extractables.

Another example of a stabilizer system that would lead to high water-blush haze and high extractables is disclosed in U.S. Pat. No. 4,571,118 ("'118"). The '118 Patent discloses a stabilizer system for PVC having a calcium soap, and, among other things, compounds having the formulas OH—X—O—R and R—X—O—R where X is a straight chain, branched or cyclic radical having 2 to about 20 oxygen atoms. These compounds will also lead to high extractables and water-blush haze upon autoclaving the stabilized PVC at 121° C. for one hour.

SUMMARY OF THE INVENTION

The present invention provides additive systems for PVC formulations to further improve the processing and functional characteristics of medical devices made from PVC. These additive systems surprisingly exceed previously known systems with respect to the melt fabrication and heat stability of the PVC (e.g., increased thermal stability for faster melt flow during extrusion without discoloration or formation of black particles; decreased plate-out or build-up on the processing equipment; decreased scrap and equipment down-time; increased use of regrind) and the desired product characteristics (e.g., low color, optical haze, water-blush, extractables and particle generation).

The additive systems of the present invention include primary and secondary stabilizers and an external lubricant. Preferably, the additive systems of the present invention include critical amounts of the combination of a zinc salt primary stabilizer with an epoxide secondary stabilizer and a polyethylene external lubricant. Other processing aids and performance additives such as antioxidants, colorants, antimicrobials and internal lubricants may be optionally included so long as they are not deleterious to the desired results discussed herein.

These additive systems may be utilized for rigid, semi-rigid or flexible PVC applications. For example, the additive systems of the present invention provide stability and processability to low or non-plasticized PVC formulations which may be injection molded to produce rigid or semi-rigid products such as filter housings, medical drip chambers, and containers. Likewise, the additive systems of the present invention also provide stability and processability to plasticized PVC formulations typically used to produce flexible medical containers and tubing for fluids such as intravenous solutions, peritoneal dialysis solutions, blood and blood products. Commonly known plasticizers include dialkyl phthalates, trialkyl trimellitates alky or aryl benzoates, citrate esters, and polymeric plasticizers such as polyurethanes, terpolymers of ethylene-vinyl acetate-carbon monoxide, and polyesters.

The PVC formulations of the present invention are functional over a wide temperature range even in excess of the glass transistion temperature of the composition. The PVC formulations may be steam sterilized at 121° C. without causing aqueous extractability, water-blush haze, color, haze, and particle generations that are required for medical use.

Additional features and advantages of the present invention are described in, and will be apparent from, the detailed description of the presently preferred embodiment.

BRIEF DESCRIPTION OF THE TABLE

Table 1 shows test data for PVC and the stabilizer systems of the present invention.

DETAILED DESCRIPTION OF THE PRESENTLY PREFERRED EMBODIMENT

The present invention provides additive systems for PVC formulations to further improve the processing of materials and the functional characteristics of medical containers, tubing devices and molded articles made from such materials. The preferred additive systems of the present invention include critical ratios of the amounts of a primary stabilizer (such as a Lewis-acid metal compound) and a secondary stabilizer. The additive system also includes an external lubricant.

The primary stabilizer is selected from the Lewis-acid metal compounds such as organo-tin compounds including dialkyl tin esters such as alkyl carboxylic esters (such as laurate and stearate), di(n-octyl)tin maleate polymer and di(n-octyl)tin-S,S'-bis(isooctyl)mercaptoacetate; organo-zinc compounds including alkyl carboxylates such as zinc salts of fatty acids (laurate, palmitate, stearate, erucate, behenate, abietates, and the like) and of polymeric ionomers based on combinations of monomers such as ethylene, alkyl acrylates, or styrene with acrylic acid, fumaric or maleic acids and the like. The primary stabilizer in the PVC formulation is in the range of 0.02–0.5 parts per hundred parts of PVC resin ("phr"). Preferably, the primary stabilizer is zinc stearate, preferably present in the amount of approximately 0.05–0.3 phr, and most preferably 0.1 phr. An advantage of zinc stearate is that it provides high optical clarity before and after sterilization by steam, ethylene oxide, or irradiation.

The secondary stabilizer of the present invention is selected from the group consisting of epoxides which are sufficiently compatible with PVC and the other formulation ingredients, that is it dissolves into the PVC and remains dissolved during processing and use, so as to provide thermal stability of the PVC formulation. Many of these epoxides are also good plasticizers of PVC and some are suitable for being the sole and primary plasticizer in the formulation. Such epoxides may be used singly or in any combination. Suitable epoxides include but are not limited to glycerol tris(epoxy oleate), low oxirane content epoxidized linseed or soya oils or partially hydrogenated unsaturated vegetable oils, propylene glycol bis(epoxy oleate), and copolymers of glycidoxy acrylate. The secondary stabilizer will contain less than approximately 5.2 oxiranes per molecule and have at least one oxirane per molecule. The secondary stabilizer is used in the PVC formulation in the range of 5 to 100 phr as required by the application of the formulation. For example, if the additive system is being added to a plasticized PVC for a flexible application (i.e., a flexible medical container), then the preferred range for the secondary stabilizer is approximately 10–20 phr. Similarly, if the additive system is being added to a non-plasticized PVC for a flexible application, then the preferred range may be approximately 40–80 phr. In the present invention, the preferred secondary stabilizer is propylene glycol bis(epoxy oleate) which typically contains 2.5 oxiranes per molecule. Furthermore, the purity of the epoxides have been found to be a critical factor in obtaining PVC formulations which have low extractability in aqueous solutions, biological fluids and tissues. Accordingly, it is desirable to have epoxides with a low concentration of low molecular weight water soluble byproducts from the epoxidation process.

This group of secondary stabilizers does not include metal ions from Groups IA or IIA (of the periodic table) whose use is known to result in water-blush haze of the plastic formulation when exposed to water (either liquid or vapor).

Melt processing is necessary for practical fabrication of PVC formulations such as those of the present invention. External lubricants provide slip against and isolation from the metals of the processing equipment; for example, film extruder screws, dies, and film cooling rolls; or injection molding screws, sprews and runners. Practical benefits of this lubrication for film extrusion are (i) faster melt flow rates, (ii) less thermal and shear-stress degradation resulting in discoloration, black specks, lower molecular weight and more water extractable byproducts, (iii) prevention of die drag lines, and (iv) prevention of loose particles on the film from buildup of degraded and cross-linked materials on the die lips, with less sticking of the film to the cooling rolls and of the finished film to itself. However, the concentration of lubricant must be sensitively balanced to achieve such benefits without excess lubricant causing poor conveyance (e.g., throughput) of the melt, build-up of lubricant "plate-out" on the die and extrusion equipment (drag lines, loose particles, and degraded material on the film), and build-up of "plate-out" on the cooling rolls (loose particles on the film).

External lubricants common in PVC formulations become concentrated, during processing, on the surfaces of the flowing melt, since they are incompatible with the other ingredients of the molten polymer formulation. The epoxide stabilizers and Lewis-acid metal compounds (and their by-products) most common in PVC formulations are also rheologically concentrated at the surfaces of the flowing melt due to their lower viscosity relative to PVC. Therefore, the flowing melt surface has a concentrated mixture of epoxide, Lewis-acid metal-compound by products, lubricant, and protonic acids (HCl and carboxylic acid from PVC dehydrochlorination and subsequent neutralization by carboxylate soaps of the stabilizer system). The Lewis-acid metal compound (and byproducts) and the protonic acid act as initiators (cross link initiators) causing the epoxide to polymerize, cross-link and consequently adhere to the metal surfaces of the processing equipment and bind with the external lubricant, pulling the lubricant from the flowing melt surface.

The tenacity and extent of build-up of this deposit depends not only on the viscosities, concentrations, amounts, and oxirane-reactivity of these components, but also on the polymerization molecular weight and cross-link density, which in turn are determined by the ratio of epoxide to cross-link initiator concentrations, and the number of oxirane groups and their proximity on the epoxide (i.e., the oxirane equivalent weight of the epoxide). Therefore, there is a critical ratio of epoxide to initiator which gives minimum plate-out while providing adequate material stability and low extractability when used with water-based fluids.

External lubricants useful in the present invention include, for example, polyethylenes, oxidized polyethylenes, polyethylene ionomers, polyfluorocarbons (e.g., polymers containing TFE, FEP, VF2, perfluoroether), paraffin waxes, ester waxes, amide waxes, poly(ethylene ether), copolymers of ethylene oxide and propylene oxide, polyamides, polypeptides, poly(vinyl alcohol), poly(ethylene-co-vinyl alcohol), polylhydroxyalkyl acrylates and methacrylates), copolymers of acrylic acid or its salts, copolymers of maleic anhydride with ethylene propylene or styrene, and polymers containing sulfonic acid groups and their salts, and, sulfonated poly(aryl sulfones). The lubricant of the present invention must be stable during processing and use, and must not contaminate the medical or biological substances which contact the PVC formulation. Each of these lubricants may be used singly or in combination, provided optimization of their concentrations and the ratio of epoxy to initiator is maintained as discussed above. Typically, lubricants are added in an amount within a range of 0.01 to 1.0 phr of the PVC. Preferably the lubricant is polyethylene and is added in an amount within a range of 0.015 phr of the PVC to 0.05 phr and more preferably 0.025–0.050, and most preferably 0.025 phr.

The performance of the PVC formulations of the present invention, as we have learned, is dependent upon the proper balance between the amounts and properties of the primary and secondary stabilizers and the external lubricants. The appropriate balance of stabilizers and lubricants are especially necessary in order to obtain low color, low extractables and little or no plate-out on melt processing equipment surfaces. Plate-out may be caused by acid catalyzed polymerization and cross-linking of the epoxide compounds at the surface of the molten PVC formulation during melt processing (i.e., compounding or fabrication) which creates a strong epoxide adhesion of external lubricant to metal surfaces contacting the melt. The strength of this adhesion depends on the molecular weight and cross-link density of the polymerized epoxide, which in turn is maximized at some intermediate stoichiometric ratio of the epoxide to the acid initiator, for example, the strong Lewis-acid byproducts of the primary stabilizer (e.g., the chlorides of tin or zinc).

Prevention or minimization of such plate-out consequently decreases the incidences of loose particles found in the contained fluids which contact the plastic surfaces, because frequently the plate-out breaks away from the processing equipment and returns loosely attached to the plastic surface. Furthermore, avoiding plate-out also prevents contamination of the PVC articles by particles (usually black specks) released from highly degraded plate-out on the hot metal surfaces of the melt processing equipment. Using this theory, we have been able to prevent plate-out even on the troublesome surfaces which are reactive to epoxide and which have high surface energy (typically above 40 dynes per cm), such as the metal surfaces commonly used to melt fabricate plasticized PVC formulations. Observed extrusions and injection moldings of and analyses of plate-out material compositions the PVC formulation of the present invention support this explanation.

A preferred embodiment of the present invention uses as a lubricant a high-density linear polyethylene of moderately high melt viscosity, having a melt index within a range of 0.5–3.0, at approximately 0.015 weight percent in a PVC formulation and stabilized by approximately 9.1 weight percent propylene glycol bis(epoxy oleate) as the secondary stabilizer, and approximately 0.063 weight percent zinc stearate (stearic acid buffered) as the primary stabilizer. When plasticized with approximately 28 weight percent diethylhexyl phthalate, the PVC formulation having the preferred additive system is extrudable as film at high rates such as 800–000 lbs. per hour on a 4½ inch extruder without plate-out, discoloration, black particles, or loose particles. Further, the PVC formulation having the preferred additive system is injection moldable without discoloration, black particles, or sticking in the mold. Articles fabricated of PVC having this preferred additive system are sterilizable by radiation, steam, or ethylene oxide without excessive discoloration (having a yellowness index less than 2 for a film of 15 mils thickness), generation of extractables or toxicity. Furthermore, PVC having this preferred additive system provides flexible containers for pharmaceutical or biological liquids which remain extraordinarily transparent after steam sterilization (e.g., having a water blush haze of less than 6% on a film 15 mils thick, measured immediately after autoclaving, and a permanent haze of less than 2%.

Several processing and functional test comparisons between film samples of the preferred embodiment of the present invention and other commercial PVC formulations are reported in Table 1. Each film sample tested is plasticized with equal amounts of diethylhexylphthalate.

The below components were blended in a high intensity mixer and extruded using a single screw extruder into a film 15 mils in thickness. The plasticizer for the following formulations is diethylhexylphthalate ("DEHP"). The secondary stabilizers were either an epoxidized linseed oil ("ELO"), or propylene glycol bisepoxy oleate ("PGBEO"). The primary stabilizer was chosen from zinc stearate ("ZnSt$_2$") or a 50/50 blend of calcium stearate and zinc stearate ("ZnSt$_2$+CaSt$_2$"). Lubricants were chosen from high density polyethylene ("HDPE") described above or ethylene bis steramide ("EBS").

Example includes: 100 parts PVC, 44 parts DEHP, 14.5 parts PGBEO, 0.025 parts HDPE, and 0.1 part ZnSt$_2$.

Control 1 includes: 100 parts PVC, 44 parts DEHP, 14.5 parts ELO, 0.4 parts EBS, and 0.2 parts ZnSt$_2$+CaSt$_2$.

Control 2 includes: 100 parts PVC, 44 parts DEHP, 14.5 parts ELO, 0.025 HDPE, and 0.29 parts ZnSt$_2$.

Control 3 includes: 100 parts PVC, 44 parts DEHP, 14.5 parts PGBEO, 0.2 parts EBS, and 0.1 parts ZnSt$_2$+CaSt$_2$.

Control 4 includes: 100 parts PVC, 44 parts DEHP, 14.5 parts PGBEO, 0.025 parts HDPE, and 0.2 parts ZnSt$_2$.

approximations of the degradation observed during extrusion of PVC film by known processes.

By measuring the yellowness index of sample films having additive systems set forth above, the thermal stability is determined. Strips of the sample films were placed in a 370° F. (188° C.) air circulating oven with strips periodically removed for testing. The yellowness index is measured by known techniques using a Colorimeter available from the Hunter Company. Of the sample films evaluated, the film having the preferred additive system ("Example") displayed the best color stability over time. Further, a film sample containing the preferred additive system and produced with 30% regrind material exhibits identical static thermal stability.

Melting and shearing the PVC material in a Brabender Fusion Head in air initially causes dehydrochlorination, leading to a gradual degradation of color. This dehydrochlorination is followed by cross-linking, evidenced by increased viscosity, stiffening and dramatic darkening of color of the PVC material. The Brabender test differs from the thermal heat aging test in that shear is applied to the material while it is being heated to specified temperature. Therefore, the results of the Brabender test depend not only on thermal stability but also on melt lubrication by the formulation ingredients. This is a close approximation to the conditions that the PVC material is subjected to during the melt fabrication processes, such as extrusion and injection

TABLE 1

| TEST ITEM | UV @ 220 nm | UV @ 241 nm | Zinc (ppm) | Oxidizables (ml) | ΔpH | Ammonium (ppm) | Plate-Out/ Building-up | Particulate Matter |
|---|---|---|---|---|---|---|---|---|
| Tolerance | 0.08 a.u. | 0.05 a.u. | NMT 0.5 | NMT 1.0 ML | NMT 1.0 | NMT 0.5 | Not Applicable. | Not Applicable. |
| EXAMPLE | | | | | | | | |
| Lot 1 Roll A | 0.051 | 0.031 | 0.27 | 0.48 | −0.74 | <0.5 | No | No |
| Roll B | 0.057 | 0.031 | 0.26 | 0.38 | −0.82 | <0.5 | | |
| Lot 2 Roll A | 0.045 | 0.027 | 0.24 | 0.40 | −0.73 | <0.5 | No | No |
| Roll B | 0.055 | 0.029 | 0.24 | 0.40 | −0.80 | <0.5 | | |
| Lot 3 Roll A | 0.048 | 0.027 | 0.26 | 0.45 | −0.82 | <0.5 | No | No |
| Roll B | 0.043 | 0.026 | 0.26 | 0.40 | −0.82 | <0.5 | | |
| EXAMPLE W/30% REGRIND | | | | | | | | |
| Lot 1 Roll A | 0.048 | 0.029 | 0.27 | 0.52 | −0.84 | <0.5 | No | No |
| Roll B | 0.051 | 0.029 | 0.26 | 0.38 | −0.84 | <0.5 | | |
| CONTROL 1 | 0.157 | 0.067 | — | 1.01 | −0.4 | <0.5 | No | Yes |
| CONTROL 2 | 0.151 | 0.050 | — | 3.63 | −0.79 | <0.5 | Yes | No |
| CONTROL 3 | | | | | | | | |
| Lot 1 Roll A | 0.046 | 0.030 | 0.12 | 0.32 | −0.65 | <0.5 | No | Yes |
| Roll B | 0.053 | 0.034 | 0.11 | 0.36 | −0.57 | <0.5 | | |
| CONTROL 4 | | | | | | | | |
| Lot 1 Roll A | 0.031 | 0.027 | 0.59 | 0.5 | −0.40 | <0.5 | Yes | Yes |
| Roll B | 0.027 | 0.027 | 0.61 | 0.35 | −0.2 | <0.5 | | |

The characteristic progression of colors that PVC exhibits on being heated (clear, colorless to yellow to yellow-orange to red to brown) is typical of systems which develop increasingly long conjugated polyene sequences. PVC is quite sensitive to even mild heating and the formation of visible color usually is the first evident indication of degradation. These changes occur long before any of the more serious manifestations of degradation become evident. If heating is continued, physical changes will occur.

Static thermal (oven) and dynamic thermal (Brabender) color stability testing provide an indication of early color generation to dehydrochlorination. These stability tests are molding. Also, recycling of ground trim or regrind means the PVC material has experienced additional heat and melt shear stress. Hence, this test can be used to simulate the addition of regrind back into an extruder or molder with virgin material, a multiple of times.

The yellowness index was measured on PVC film samples having the additive systems set forth above. Original film samples were generated by known extrusion methods discussed above (number of passes=0). The original samples were then processed in the Brabender equipment at 370° F. (188° C.), 60 rpm in air, for 20 minutes (number of passes= 1). Recycling of regrind was completed 4 times with samples having 70 percent original film and 30 percent regrind from the immediately prior sample (number of passes=2, 3, 4, 5). For example, samples for pass 2 were 70 percent original film and 30 percent regrind film from pass 1 samples. The film sample having the preferred additive system (Example) displayed the best color stability under processing conditions similar to conditions typical of known extrusion processes (heat, shear and contamination with regrind).

Further, we have learned that critical concentrations of primary stabilizer, Lewis-acid metal compounds preferably zinc stearate, and secondary stabilizer, epoxide, preferably propylene glycol bis(epoxy oleate), has resulted in surprising and unexpected improvements to the thermal stability (as expressed in yellowness index). We have also learned that a critical ratio of the primary stabilizer to the secondary stabilzer gives unexpected processability of the PVC material (low plate out, and black particles).

A Lewis-acid metal compound, such as zinc stearate ("ZnSt$_2$"), reacts in a well known fashion to replace labile chlorocarbons on PVC in accordance with Formula 1 and to neutralize hydrochloric acid as in Formula 2.

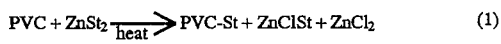  (1)

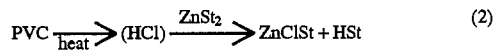  (2)

Excessive concentration of zinc stearate (e.g., Control 4) will result in an increase of zinc chloride which will catalyze further degradation and dehydrochlorination of PVC. We have discovered that excessive zinc chloride will also act as an initiator for the cross-linking of epoxide, causing a greater amount of plate out during the extrusion and black particles during extrusion or injection molding. In this way, excessive zinc chloride will also cause depletion of oxiranes, resulting in further loss of stability. Conversely, if the concentration of zinc stearate (e.g., Control 3) is too low, PVC will dehydrochlorinate to form HCl, which accelerates this degradation process and initiates the cross-linking consumption of the oxiranes.

Stabilization by a critical amount of epoxide through the prevention of acid generation by reaction with labile chlorocarbons on the PVC (Formula 3) and the simultaneous removal of zinc chloride (Formula 4).

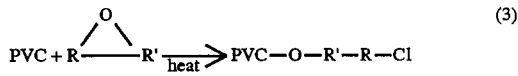  (3)

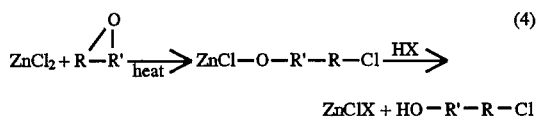  (4)

where X is —OH or stearate.

However, an excessive concentration of epoxide does not provide significantly better stabilization of color, but rather, results in more cross-linked epoxide, initiated by acids generated during heating. Otherwise, low concentration of epoxide will be rapidly consumed and, therefore, insufficient in providing stabilizing protection.

By utilizing the preferred additive system, further processing efficiencies and savings are realized. As indicated in Table 1, we have surprisingly found that plate-out or build-up of material on the processing equipment is not experienced when the additive system of the present invention is used. Therefore, higher amounts of lubricant may be used for improved melt fabrication without suffering plate-out.

This absence of plate-out on extrusion dies and build-up on chill rolls eliminates down time of extrusion equipment. Further, generation of dark particulate matter from build-up within the melt processing equipment during processing is not experienced. An approximate 20–30% reduction in scrap rates is achieved when using-the additive system of the present invention as compared to currently available PVC materials.

Improved product characteristics have also been realized when products are manufactured from PVC material having the inventive additive system. For example, medical containers, ports and tubing made from such PVC material have lower extractables and improved transparency after steam sterilization Following Japanese Pharmacopeia XII Monograph ("JPXII") for extractive substances in medical containers, extruded film materials of PVC formulations containing the various additive systems described above, are examined. Film samples are cut into strips and autoclaved at 121° C. for 1 hour in 200 ml of distilled, deionized water. The aqueous extract is analyzed for the presence of zinc, ammonia, and oxidizables; a change in pH; and, UV absorbing substances (at 241 and 220 nm wavelengths).

The results shown in Table 1 of the JPXII extractive substances data of film material samples with and without regrind confirm that the film material having the PVC additive system of the present invention is within the tolerance guidelines of the JPXII standards.

The plateout/building up was determined by extruding film through a die onto a chill roll. Then the chill roll was inspected for accumulating deposits on the roll. If plateout/building-up was observed a "yes" was recorded on TABLE 1. The particulate matter was measured by observing the extruded film for visible particles in or on the film. If particles were observed a "yes" was recorded in TABLE 1.

It should be understood that various changes and modifications to the presently preferred embodiment described herein will be apparent to those skilled in the art. For example, it is foreseeable this inventive additive system is useful for chlorinated polyolefins such as chlorinated polyethylene and polypropylene as well as for PVC. Such changes and modifications can be made without departing from the spirit and scope of the present invention and without diminishing its attendant advantages. It is therefore intended that such changes and modifications be covered by the appended claims.

We claim:

1. An additive system for a polyvinyl chloride formulation for improved processability while maintaining thermal stability of the formulation, the additive system consisting essentially of:

primary stabilizer of a Lewis acid metal compound selected from the group consisting of a dialkyl tin ester, a di (n-octyl) tin maleate polymer and a di (n-octyl) tin-S, S'-bis (isooctyl) mercaptoacetate in an amount of approximately 0.02 to 0.5 parts per one hundred parts of the polyvinyl chloride;

a secondary stabilizer selected from the group consisting of epoxide compounds having less than approximately 5.2 oxirane groups per molecule, in an amount of approximately 5 to 100 parts per one hundred parts of the polyvinyl chloride;

an effective amount of an external lubricant for lubrication of the polyvinyl chloride formulation;

wherein the ratio of the primary stabilizer to the secondary stabilizer limits extractables and generating build-up and plate-out during processing of the formulation; and wherein the formulation has a water blush haze of less than 6% on a film 15 mils thick after autoclaving the formulation.

2. An additive system for a polyvinyl chloride formulation having improved processability while maintaining thermal stability and useful in the production of medical products, the additive system consisting essentially of:

a primary stabilizer of a Lewis acid metal compound selected from the group consisting of organo-tin compounds and organo-zinc compounds, an amount of approximately 0.02 to 0.5 parts per one hundred parts of the polyvinyl chloride;

a secondary stabilizer selected from the group consisting of epoxide compounds has approximately 2.5 oxirane groups per molecule, in an amount of approximately 5 to 100 parts per one hundred parts of the polyvinyl chloride;

an effective amount of an external lubricant for lubrication of the polyvinyl chloride formulation;

wherein the ratio of the primary stabilizer to the secondary stabilizer limits extractables and generating build-up and plate-out during processing of the formulation; and wherein the formulation has a water blush haze of less than 6% on a film 15 mils thick after autoclaving the formulation.

3. The additive system of claim 1 wherein the secondary stabilizer is propylene glycol bis(epoxy oleate).

4. The additive system of claim 1 wherein the external lubricant is selected from the group consisting of polyethylenes, oxidized polyethylenes, polyethylene ionomers, polyfluorocarbons, paraffin waxes, ester waxes, amide waxes, poly(ethylene ether), copolymers of ethylene oxide and propylene oxide, polyamides, polypeptides, poly(vinyl alcohol), poly(ethyleneco-vinyl alcohol), poly(hydroxyalkyl acrylates and methacrylates), copolymers of acrylic acid or its salts, copolymers of maleic anhydride with ethylene propylene or styrene, polymers containing sulfonic acid groups and their salts, and, sulfonated poly(aryl sulfones).

5. The additive system of claim 1 wherein the external lubricant is high-density linear polyethylene having a melt index of 0.5 to 3.0.

6. The additive system of claim 1 wherein the amount by weight of the primary stabilizer is approximately 0.05 to 0.3 parts per hundred parts of the polyvinyl chloride.

7. The additive system of claim 1 wherein the amount by weight of the secondary stabilizer is approximately 10 to 20 parts per hundred parts of the polyvinyl chloride.

8. The additive system of claim 1 wherein the amount by weight of the secondary stabilizer is approximately 40 to 80 parts per hundred parts of the polyvinyl chloride.

9. An additive system for a polyvinyl chloride formulation for improved processability while maintaining thermal stability of the formulation, the additive system consisting essentially of:

a primary stabilizer of a Lewis acid metal compound selected from the group consisting of organo-tin compounds and organo-zinc compounds, in an amount of approximately 0.02 and 0.5 parts per hundred parts of the polyvinyl chloride;

a secondary stabilizer of a propylene glycol bis(epoxy oleate) having less than approximately 5.2 oxirane groups per molecule, and in an amount by weight of approximately 5 to 100 parts per hundred parts of the polyvinyl chloride;

an effective amount of an external lubricant for lubrication of the polyvinyl chloride formulation;

wherein the ratio of the primary stabilizer to the secondary stabilizer limits extractables and generating build-up and plate-out during processing of the formulation; and wherein the formulation has a water blush haze of less than 6% on a film 15 mils thick after autoclaving the formulation.

* * * * *

UNITED STATES PATENT AND TRADEMARK OFFICE
CERTIFICATE OF CORRECTION

PATENT NO. : 5,643,501
DATED : July 1, 1997
INVENTOR(S) : Angeles Lillian Buan, et. al.

It is certified that error appears in the above-indentified patent and that said Letters Patent is hereby corrected as shown below:

Column 10, line 51, before the word primary, insert --a--.

Signed and Sealed this

Eighteenth Day of November 1997

*Attest:*

BRUCE LEHMAN

*Attesting Officer*  *Commissioner of Patents and Trademarks*